United States Patent
Resch et al.

(10) Patent No.: US 10,057,561 B2
(45) Date of Patent: *Aug. 21, 2018

(54) SYSTEMS AND METHODS FOR FACILITATING THREE-DIMENSIONAL RECONSTRUCTION OF SCENES FROM VIDEOS

(71) Applicants: Disney Enterprises, Inc., Burbank, CA (US); ETH Zurich, Zurich (CH)

(72) Inventors: Benjamin Resch, Tubingen (DE); Hendrik Lensch, Rottenburg (DE); Marc Pollefeys, Zurich (CH); Oliver Wang, Zurich (CH); Alexander Sorkine Hornung, Zurich (CH)

(73) Assignees: Disney Enterprises, Inc., Burbank, CA (US); ETH Zurich, Zurich (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/583,772

(22) Filed: May 1, 2017

(65) Prior Publication Data
US 2017/0237968 A1 Aug. 17, 2017

Related U.S. Application Data

(63) Continuation of application No. 14/970,346, filed on Dec. 15, 2015, now Pat. No. 9,648,303.

(51) Int. Cl.
*G06K 9/00* (2006.01)
*H04N 13/02* (2006.01)
(Continued)

(52) U.S. Cl.
CPC ......... *H04N 13/0264* (2013.01); *G06T 7/246* (2017.01); *G06T 7/73* (2017.01);
(Continued)

(58) Field of Classification Search
CPC ... G06T 7/0026; G06T 7/0042; G06T 7/2033; G06T 7/246; G06T 7/73;
(Continued)

(56) References Cited

U.S. PATENT DOCUMENTS 8,908,775 B1* 12/2014 Higa .................. H04N 19/90
375/240.26
9,171,225 B2* 10/2015 Fukaya .................. G06K 9/46
(Continued)

*Primary Examiner* — Amara Abdi
(74) *Attorney, Agent, or Firm* — Sheppard Mullin Richter & Hampton LLP

(57) ABSTRACT

Scenes reconstruction may be performed using videos that capture the scenes at high resolution and frame rate. Scene reconstruction may be associated with determining camera orientation and/or location ("camera pose") throughout the video, three-dimensional coordinates of feature points detected in frames of the video, and/or other information. Individual videos may have multiple frames. Feature points may be detected in, and tracked over, the frames. Estimations of camera pose may be made for individual subsets of frames. One or more estimations of camera pose may be determined as fixed estimations. The estimated camera poses for the frames included in the subsets of frames may be updated based on the fixed estimations. Camera pose for frames not included in the subsets of frames may be determined to provide globally consistent camera poses and three-dimensional coordinates for feature points of the video.

20 Claims, 4 Drawing Sheets

(51) Int. Cl.
*G06T 7/246* (2017.01)
*G06T 7/73* (2017.01)

(52) U.S. Cl.
CPC ............ *G06T 2207/10021* (2013.01); *G06T 2207/30244* (2013.01)

(58) Field of Classification Search
CPC ........... G06T 2207/10021; G06T 2207/30244; G06K 9/00664; G06K 9/4604; H04N 13/0264
See application file for complete search history.

(56) References Cited

U.S. PATENT DOCUMENTS

| | | | | |
|---|---|---|---|---|
| 2010/0194863 | A1* | 8/2010 | Lopes | G06T 19/00 348/50 |
| 2012/0105602 | A1* | 5/2012 | McNamer | H04N 13/0022 348/50 |
| 2012/0249751 | A1* | 10/2012 | Zhang | H04N 13/0066 348/47 |
| 2013/0215233 | A1* | 8/2013 | Wang | G06T 17/00 348/47 |
| 2014/0241576 | A1* | 8/2014 | Yu | G06T 7/55 382/103 |
| 2014/0368689 | A1* | 12/2014 | Cao | G06K 9/52 348/222.1 |
| 2015/0138322 | A1* | 5/2015 | Kawamura | G06T 7/73 348/46 |

* cited by examiner

SYSTEMS AND METHODS FOR FACILITATING THREE-DIMENSIONAL RECONSTRUCTION OF SCENES FROM VIDEOS

FIELD OF THE DISCLOSURE

This disclosure relates to three-dimensional reconstruction of scenes from videos.

BACKGROUND

Structure from Motion (SfM), Simultaneous Localization and Mapping (SLAM), bundle adjustment, and/or other techniques may be used for three-dimensional scene reconstruction. Three-dimensional scene reconstruction may include determining one or more of a camera location, camera orientation, and/or scene geometry from images. One or more techniques may involve feature point detection within individual images and/or feature point tracked over multiple images. Feature point detection and/or tracking may be accomplished using one or more of Scale-Invariant Feature Transform (SIFT), Speeded Up Robust Features (SURF), Orientated Features From Accelerated Segment Test and Rotated Binary Robust Independent Elementary Features (ORB), Kanade-Lucas-Tomasi (KLT), and/or other techniques for detecting and/or tracking feature points in images. One or more feature point detection and/or tracking processes may return feature point descriptors and/or other information. By way of non-limiting example, a feature point descriptor may comprise information including one or more of a spatial histogram of the image gradients and/or other information, a sum of the Haar wavelet response around feature point, an intensity distribution of pixels within a region surrounding a feature point, and/or other information.

A bundle adjustment process may be used to determine one or more of three-dimensional coordinates describing a scene geometry, parameters of relative motion, parameters of optical characteristics of camera(s) employed to acquire the images, and/or other information.

SUMMARY

One aspect of the disclosure relates to a system configured for facilitating three-dimensional reconstruction of scenes from videos. In some implementations, three-dimensional reconstruction of a scene from a given video may be facilitated by one or more of detecting and/or tracking feature points over frames of the given video, determining camera location and/or orientation (herein also referred to as "camera pose") for individual frames of the given video, determining 3D coordinates of feature points describing the scene geometry (e.g., scene structure reconstruction), and/or other operations.

Mobile computing platforms such as smartphones and/or other computing platforms may be configured to record video with a frame rate up to hundreds of frames per second, thousands of frames per second and/or other ranges. Some computing platforms may be configured to produce images with a resolution up tens of megapixels or higher. Such videos may yield thousands of images in just a few seconds of capture. Current approaches for camera orientation, location, and/or scene geometry reconstruction may not scale well to such densely-sampled images. These disadvantages may be due to one or more of numerical inaccuracies arising from small baselines, computational tractability associated with the sheer quantity of pixels, the sheer amount of data captured from use of multiple image capturing devices, and/or other disadvantages.

In some implementations, the system may be configured to address one or more disadvantages of current methods of three-dimensional scene reconstruction by performing operations comprising one or more of compensating for drift that may occur when tracking feature points over thousands of frames, selecting subsets of frames of a video to perform an initial estimation of camera pose, performing piecewise camera pose estimations over these select subsets of frames, ensuring uniform image coverage based feature point subsampling, utilizing linear camera pose estimation (LCPE) and/or other techniques to make multiple estimations of camera pose made for given frame consistent with each other, utilizing wide baseline fixed estimations for updating camera pose estimations, and/or other operations.

The system may be configured to facilitate obtaining a globally consistent extrinsic camera pose determination in substantially less time than current approaches on videos comprising thousands of high resolution frames. By way of non-limiting example, by performing piecewise camera pose estimations for select subsets of frames, making the estimations consistent within each other based on these local piecewise estimations, and/or using at least some of the estimations as fixed camera poses, the other non-fixed camera pose estimations may be made globally consistent by updating the estimations in accordance with the fixed estimations. One or more techniques described herein may allow for rapid, globally consistent camera pose determination and/or scene geometry reconstruction across multiple capture devices.

In some implementations, the system may include one or more physical processors configured by machine-readable instructions. Executing the machine-readable instructions may cause the one or more physical processors to facilitate three-dimensional reconstruction of scenes from videos by performing one or more of determining three-dimensional coordinates for detected feature points, determining orientation and/or location of a camera used to capture a video, and/or other operations. The machine-readable instructions may include one or more of a video component, a feature component, an estimation component, an anchor component, a global component, and/or other components.

The video component may be configured to obtain one or more videos. A given video may have multiple frames. A given video may depict one or more scenes captured from a perspective of one or more cameras. By way of non-limiting example, the video component may obtain a first video and/or other videos. The first video may depict a first scene and/or other scenes captured from a first camera and/or other cameras.

The feature component may be configured to perform one or more of detecting feature points in individual frames, tracking feature points over consecutive frames, and/or other operations. By way of non-limiting example, the feature component may be configured to detect feature points of the first scene in individual frames of the first video. For example, a first set of feature points and/or other sets of feature points may be detected in a first frame and/or other frames of the first video.

The feature component may be configured to track feature points over consecutive frames by correlating detected feature points between consecutive frames. By way of non-limiting example, the feature component may be configured such that the first set of feature points and/or other sets of feature points may be tracked from the first frame to one or more other frames. Tracking may include correlating the first set of feature points and/or other sets of feature points detected in the first frame with one or more other detections of the first set of feature points and/or other sets of feature points in the one or more other frames.

The estimation component may be configured to make estimations of one or more of three-dimensional coordinates for detected feature points, camera orientations and/or locations, and/or other information for individual frames within individual subsets of frames. By way of non-limiting example, the estimation component may be configured to make estimations of orientations and/or locations of the first camera in the first scene for individual frames within a first subset of frames of the first video, a second subset of frames of the video, and/or other subsets of frames of the first video. In some implementations, the second subset of frames may comprise at least one frame that may not be included in the first subset of frames. The estimations may be based on detected and tracked feature points within the first subset of frames, second subsets of frames, and/or other subsets of frames, receptively. By way of non-limiting example, an estimation of a first orientation and/or location of the first camera may be made for a first frame and/or other frames in the first subset of frames based on the detected and/or tracked feature points of the frames of the first subset of frames. An estimation of a second orientation and/or location of the first camera may be made for a second frame and/or other frames in the second subset of frames based on the detected and/or tracked feature points of the frames of the second subset of frames.

The anchor component may be configured to identify frames where estimations of camera orientation and/or location may be used as fixed estimations of orientation and/or location. By way of non-limiting example, frames that may be identified as being associated with an estimation that may be considered a fixed estimation may be used to facilitate updating one or more other estimations. By way of non-limiting example, updating estimation may address inconsistencies between estimations made for frames within individual subsets of frames.

The global component may be configured to determine orientation and/or location of one or more cameras for individual frames of a video, determine three-dimensional coordinates of feature points describing the scene geometry, and/or other operations. Determining orientation and/or location of a given camera may be based on updating the estimations of camera orientation and/or location within individual subsets of frames based on the frames where camera pose estimations may have been identified as being associated with fixed estimations of camera pose, determining camera orientation and/or location for one or more frames where an estimation may not have been made, and/or other information. By way of non-limiting example, the global component may be configured to determined orientation and/or location of the first camera in the frames of the first video based on the estimated first camera orientation and/or location, estimated second camera orientation and/or location, and/or other estimated camera orientation and/or locations; one or more frames identified as being associated with fixed estimations of camera pose; and/or other information. The global component may be configured to determine three-dimensional coordinates of feature points detected in the frames of the first video using bundle adjustment and/or other techniques. The determined orientation and/or location of the first camera for the frames of the first video and/or three-dimensional coordinates of feature points may facilitate three-dimensional reconstruction of the first scene of the video.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
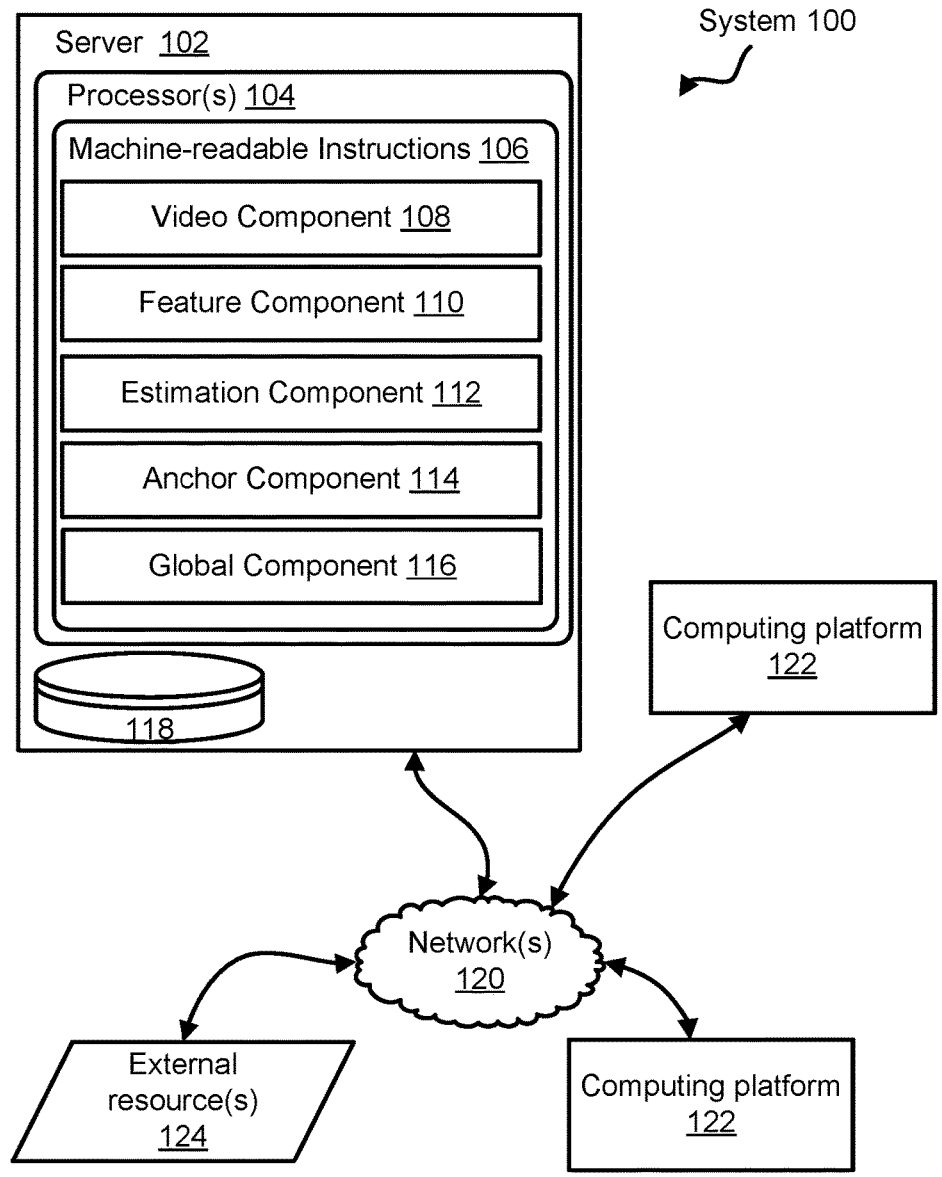
FIG. 1 illustrates a system configured for facilitating three-dimensional reconstruction of scenes from videos, in accordance with one or more implementations.

FIG. 1 illustrates a system 100 configured for facilitating three-dimensional reconstruction of scenes from videos, in accordance with one or more implementations. A video may comprise a recorded video, a live feed, and/or other audio-visual asset. A given video may have multiple frames, a sound track, and/or other components.

In some implementations, the system 100 may comprise a server 102, one or more computing platforms 122, and/or other components. The server 102 may include one or more physical processors 104 configured by machine-readable instructions 106. Executing the machine-readable instructions 106 may cause the one or more physical processors 104 to facilitate three-dimensional reconstruction of scenes from videos. The machine-readable instructions 106 may include one or more of a video component 108, a feature component 110, an estimation component 112, an anchor component 114, a global component 116, and/or other components.

In some implementations, the server 102 may be configured to provide remote hosting of the features and/or function of the machine-readable instructions 106 to one or more computing platforms 122 that may be remotely located from the server 102. However, in some implementations, one or more features and/or functions of server 102 may be attributed as local features and/or functions of one or more computing platforms 122. By way of non-limiting example, individual ones of the computing platforms 122 may include machine-readable instructions comprising the same or similar components as machine-readable instructions 106 of server 102. The computing platforms 122 may be configured to locally execute the one or more components that may be the same or similar to the machine-readable instructions 106.

The computing platforms 122 may include one or more of a cellular telephone, a smartphone, a digital camera, a laptop, a tablet computer, a desktop computer, a television set-top box, smart TV, a gaming console, and/or other platforms.

In some implementations, the video component 108 may be configured to obtain videos and/or other information. Individual videos may depict one or more scenes captured from one or more perspectives of one or more cameras. A scene may represent one or more objects, actors, and/or other elements captured by one or more cameras in one or more locations. In some implementations, a video may comprise one or more individual video segments captured from different cameras. For example, a video may comprise a collection of one or more individual video segments captured from different cameras.

Figure 2:
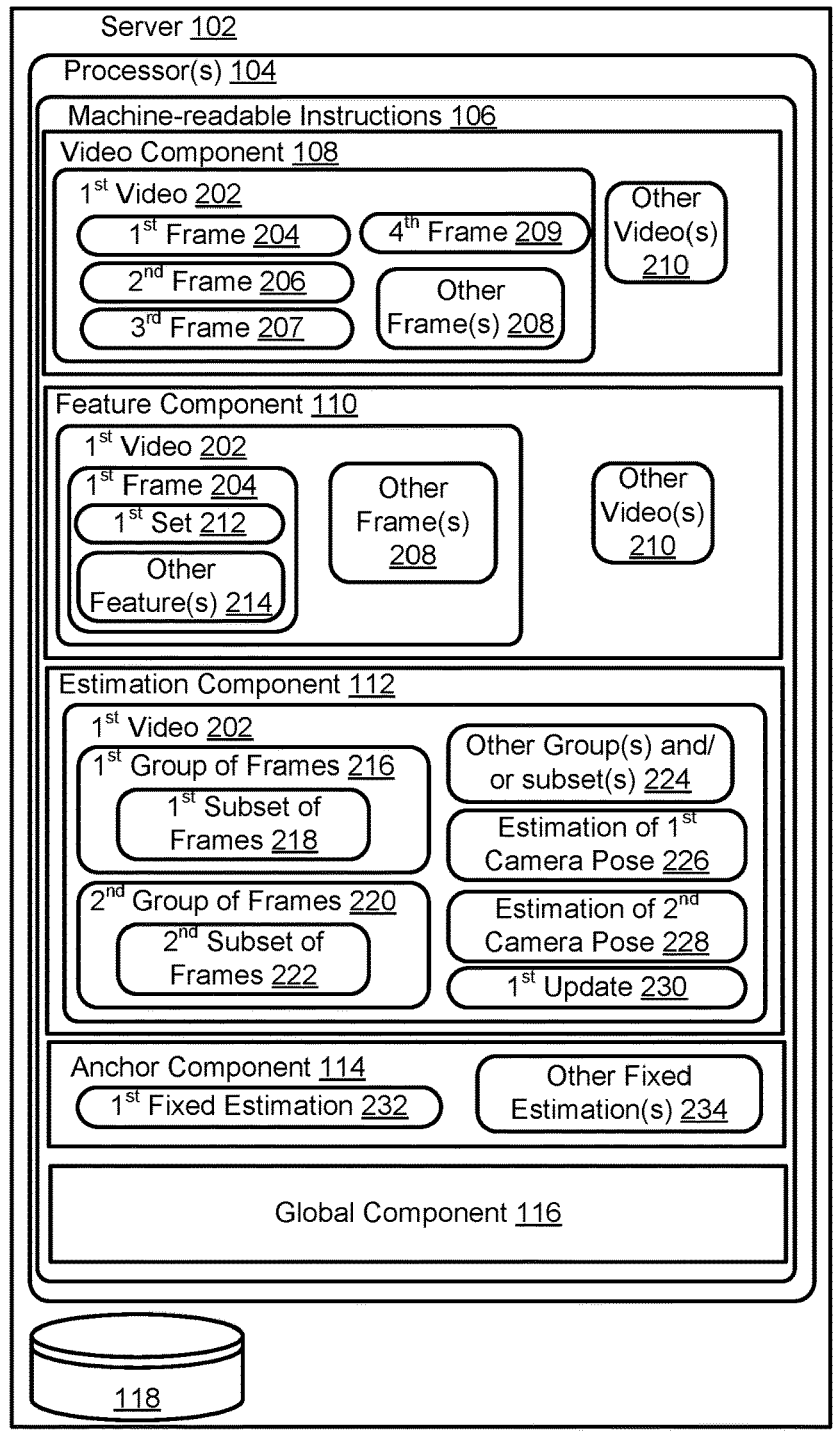
FIG. 2 illustrates an exemplary implementation of a server employed in the system of FIG. 1.

By way of non-limiting illustration in FIG. 2, the video component 108 may be configured to obtain a first video 202 and/or other videos 210. The first video 202 may have a first frame 204, a second frame 206, a third frame 207, a fourth frame 209, and/or other frames 208. The first video 202 may depict a first scene and/or other scenes. The first scene may have been captured from a first camera and/or other cameras.

Returning to FIG. 1, the feature component 110 may be configured to detect feature points of scenes portrayed in individual frames of the videos, track feature points over consecutive frames, and/or perform more or less operations. In some implementations, feature tracking may comprise correlating feature point detections between consecutive frames and/or other techniques for tracking feature points over consecutive frames of a video. By way of non-limiting example, a first feature point and/or set of feature points may be detected in a first frame of a video. The first feature point and/or set of feature points may be tracked over one or more consecutive frames of the video by one or more of detecting the first feature point and/or set of feature points in the one or more consecutive frames following the first frame, correlating the first feature point and/or set of feature points within individual frames with the detection of the first feature point and/or set of feature points in the first frame, and/or other operations. In some implementations, feature detection and/or tracking may be accomplishing using techniques including one or more of SfM, SLAM, SIFT, SURF, ORB, KLT, and/or other techniques.

In some implementations, feature component 110 may be configured such that detecting and/or tracking of feature points may further comprise correcting for an occurrence of drift. Drift may be associated with errors that may occur during correlation of feature points as they are detected and tracked through a sequence of frames. By way of non-limiting example, for densely sampled video sequences, one or more feature may be trackable over hundreds of frames. These tracks may exhibit drift. For some high frame rate image capture devices, this may correspond to a second of video. As one correction technique, a set of feature points may be initially detected in a given frame, referred to as the "original" frame. The set of feature points may be correlated to detections of similar sets of feature points in one or more subsequent frames. The detection of the correlated sets of feature points in individual ones of the subsequent frames may be refined based on the detection of the set of feature points from the original frame. In some implementations, this and/or other correction techniques may result in considerably reduced drift and/or ultimately a higher scene reconstruction quality.

By way of non-limiting illustration in FIG. 2, the feature component 110 may be configured to detect feature points of the first scene and/or other scenes in individual frames of the first video 202 and/or other videos. The feature component 110 may be configured to track feature points over consecutive frames of the first video by correlating feature points between consecutive frames. By way of non-limiting example, the feature component 110 may be configured to detect a first set 212 of feature points in the first frame 204 of the first video 202 and/or other sets 214 of feature points in other frames of the first video 202. The feature component 110 may be configured such that the first set 212 of feature points may be tracked from the first frame 204 to one or more other frames. The first set 212 of feature points may be tracked by correlating the first set 212 of feature points detected in the first frame 204 with other detections of the first set 212 of feature points in the one or more other frames. The other detections of the first set 212 of feature points in the one or more other frames may be refined based on the detection of the first set 212 of feature points in the first frame 204.

Returning to FIG. 1, the estimation component 112 may be configured to perform one or more of determining subsets of frames of a given video, making estimations of orientations and/or locations of a camera for individual frames within individual subsets of frames, and/or more or less operations.

In some implementations, determining subsets of frames may comprise one or more of assigning frames into one or more groups (also referred to as "windows"), selecting at least some of the frames of a given group to include in a subset of frames, and/or other operations. In some implementations, assigning frames to one or more groups may be accomplished using a sliding window technique and/or other techniques. By way of non-limiting example, in the sliding window technique, the window may grow and/or shrink in size as it "slides" through a sequence of frames. In some implementations, different windows may "overlap" in the frames assigned to that window. For example, a first group of frames may include one or more other frames that may be commonly assigned to a second group of frames. In other words, a first group of frames may include at least one frame that may also be associated with a second group of frames.

In some implementations, selecting frames from a group of frames to include in a subset of frames may be based on determining, for individual frames in the group of frames, values for the one or more confidence parameters and/or other information. In some implementations, if the determined values meet and/or exceed corresponding threshold values for the one or more confidence parameters, the frames may be selected for a subset of frames of that group. In some implementations, confidence parameters may be associated with one or more of a quantity of feature points in a given frame that correspond to feature points detected in one or more other frames of a given group, a distance a camera has moved within the first scene by a point in time corresponding to a given frame, a reprojection error for feature points detected in, and tracked to, the given frame, and/or other information. By way of non-limiting illustration, the following and/or other techniques may be used to select frames from a group of frames for inclusion in a subset of frames for which camera pose estimations may be made.

In some implementations, a first confidence parameter, second confidence parameter, third confidence parameter, and/or other confidence parameters of a given frame may be considered for determining whether the given frame may be suitable for inclusion in a subset of frames for which estimations of camera orientation and/or location may be made. Values for the first confidence parameter may be determined based on a quantity of feature points in a given frame that may be matched to the one or more feature points tracked over a given group of frames with a low reprojection error. This may ensure that there may be sufficiently many constraints for estimating camera orientation and/or location. In some implementations, a threshold value for the first confidence parameter for which a given frame may be selected for a subset of frames may be in the range of 20 feature points to 80 feature points, and/or other ranges. In some implementations, a threshold value for the first confidence parameter for which a given frame may be selected for a subset of frames may be in the range of 30 feature points to 70 feature points, and/or other ranges. By way of non-limiting example, a frame may be disregarded for selection for a subset of frames if the frame includes less than 30 and/or more than 70 feature points that match feature points tracked over a given group, or window, of frames.

Values for the second confidence parameter may be determined based on how far a camera may have moved around one or more feature points tracked over the frames of a given group by the point in time corresponding to a given frame. Movement of a camera may be determined based on a median of individual feature points' angular differences between vectors from the current frame and a previous frame. In some implementations, the value of the second confidence parameter may facilitate one or more of making sure that two frames selected for a subset of frames may not be too far apart (e.g., relative a threshold) from each other based on a threshold angular difference, and/or that a visual appearance of feature points in a given frame may not change too much (relative a threshold) so that the next frame selected for a subset may have one or more of the same or similar tracked feature points. In some implementations, a threshold value for the second confidence parameter for which a given frame may be selected for a subset of frames may be in the range of zero degrees to 10 degrees of angular movement, zero degrees to 5 degrees of angular movement, and/or other ranges. By way of non-limiting example, a given frame may be selected for a subset of frames if, by the point in time corresponding to the given frame, the camera has not move more than 5 degrees around one or more of the feature points in the frame. By way of non-limiting example, a given frame may be disregarded for selection for a subset of frames if, by the point in time corresponding to the given frame, the camera has moved more than 10 degrees around one or more of the feature points in the frame. It is noted that above mentioned values and/or ranges are provided for illustrative purposes only and are not to be considered limiting. For example, in other implementations, different values and/or ranges may be utilized.

Values for the third confidence parameter may be determined based on a median reprojection error of detected feature points in a given frame. This may ensures that little or no frames may be added to a subset of frames which may be inconsistent with the feature points tracked over a given group. In some implementations, a threshold value for the third confidence parameter for which a given frame may be selected for a subset of frames may be in the range of 0 pixels to 8 pixels of median reprojection error, 0 pixels to 5 pixels of median reprojection error, and/or other ranges. By way of non-limiting example, a given frame may be disregarded for selection for a subset of frames if the given frame includes a median reprojection error for the detected feature points in the given frame that may be more than 5 pixels and/or other values.

In some implementations, a combination of one or more of the determined values for the first confidence parameter, second confidence parameter, third confidence parameter, and/or other confidence parameters may be considered when determining whether a frame in a group of frames may be selected for a subset of frames for which estimations of camera orientation and/or location may be made. By way of non-limiting example, a frame may be selected for a subset of frames if it is determined that the frame may be linked to at least 30 of the tracked feature points over a given group, does not rotate more than five degrees around one or more of these points (e.g., half of these points and/or other quantity), and/or at least half of these feature points have less than a five pixel median reprojection error. Similarly, a frame may be disregarded as a candidate for a given subset of frames if it is determined that the frame is linked to more than 70 feature points in the group of frames, and/or rotates more than ten degrees around at least some of these feature points (e.g., half of these feature points and/or other quantity).

In some implementations, given one or more values for one or more confidence parameters for frames of a given group into a given subset of frames, inclusion (or non-inclusion) of one or more frames into individual subsets of frames may be determined. In some implementations, for a given group of frames, a range of 3 to 8 frames, 1 to 10 frames, 5 to 50 frames, and/or other quantities of frames may be selected from a group for inclusion in a corresponding subset of frames. It is noted that these values and/or ranges are provided for illustrative purposes only and are not to be considered limiting. For example, in other implementations, different values and/or ranges may be utilized.

The estimation component 112 may be configured to make estimations of orientations and/or locations of one or more cameras for individual frames within individual subset of frames of a given video. The estimations may be based on the detected and tracked feature points association with frames in the individual subsets of frames.

In some implementations, estimations of orientations and/or locations of a given camera may comprise performing one or more of a bundle adjustment, and/or other camera pose estimation techniques using one or more frames of the individual subsets of frames. In some implementations, the bundle adjustment may further return estimations of three-dimensional coordinates for feature points tracked over the corresponding subset of frames. This step may comprise a piecewise camera pose estimation step, as presented herein.

In some implementations, prior to performing a bundle adjustment, orientation and/or location for a camera associated with frames of a given group of frames may be initialized. By way of non-limiting example, camera orientation and/or location may be initialized by one or more of picking the first "N" consecutive frames in the group of frames (where "N" is an integer greater than zero), performing a bundle adjustment on those frames, and/or other operations. In some implementations, the step of performing a bundle adjustment on the first N frames may be performed in accordance with a parameterization where feature points in those frame may be represented by inverse depth values projected from a reference frame. In some implementations, a center frame and/or other frame in the group of frames may be used as the reference frame. In some implementations, one or more initialization operations may be performed over one or more iterations starting from different linearly displaced configurations, solving first for a camera orientation and/or location, and then solving for other extrinsic information. Results that may correspond to relatively lowest reprojection error may be employed for subsequent estimations. In some implementations, "N" may be in the range of 5 to 15 frames and/or other range. By way of non-limiting example, "N" may be 11 frames and/or other value.

For individual subsets that may include frames that may be shared with other subsets, estimations for camera pose at a given frame may be updated based on prior estimations for camera pose for that given frame (based on its inclusion in one or more other subsets for which camera pose estimation may have previously been made). For example, as presented above, individual groups of frames may commonly share one or more frames with one or more other groups. Consequently, individual subsets of frames may commonly share one or more frames with one or more other subsets of frames. As such, multiple estimations may be made for camera pose at a given frame based on feature points in different ones of the subsets of frames. In some implementations, updating estimations of camera pose at a given frame may be based on linear camera pose estimation, global camera pose optimization, bundle adjustment, and/or other techniques. In some implementations, this may be considered as making multiple camera pose estimations for a given frame "consistent" with each other.

Figure 3:
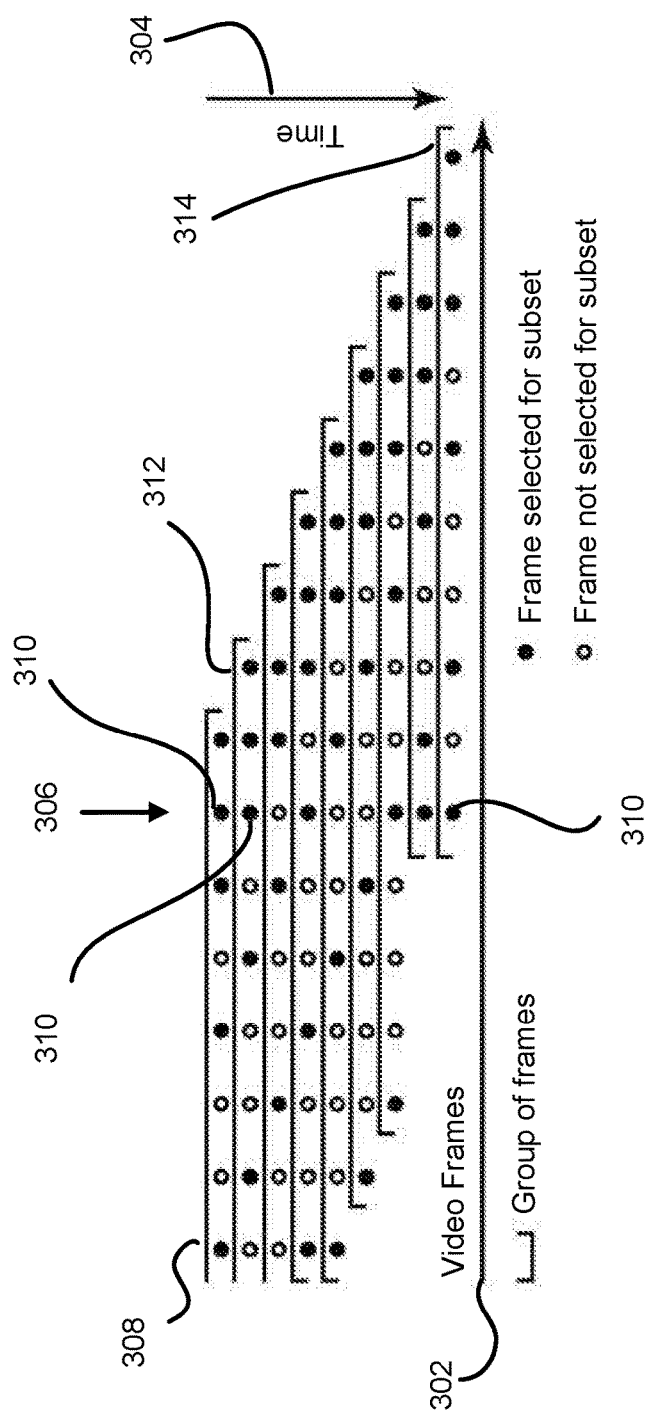
FIG. 3 illustrates a graphical representation of a process of performing piecewise camera pose estimations over select subsets of frames of a given video, in accordance with one or more implementations.

By way of non-limiting illustration in FIG. 3, a graphical representation of performing piecewise camera pose estimation over individual subsets of frames is shown. In the illustration, the temporal progression of frames of a video may be portrayed by an "x-axis" 302 shown advancing from left to right (relative the plane of the paper), while the temporal progression of the piecewise estimations for subsets of frames may be portrayed by a "y-axis" 304 shown as advancing from top to bottom (relative the plane of the paper). Individual frames of the video may be represented as dots in the figure. Groups of frames may be represented by the bracket element placed around a horizontal series of the dots. The solid color dots may represent frames within a group of frames selected for a corresponding subset of frames and for which an estimation of camera orientation and/or location may be made. The remaining non-solid dots may represent frames within a group of frames that may not have been selected for inclusion in the subset of frames. Different groups may share one or more common frames. This is visually illustrated by the vertical columns of dots that appear in more than one bracketed group. By way of non-limiting example, column 306 shows multiple dots which represent the same frame included in different groups. During the progression of performing piecewise estimations of camera pose for individual frames within individual groups, frames for which multiple estimations of camera pose have been made may be made consistent with each other via linear camera pose estimation, global camera pose optimization, bundle adjustment, and/or other techniques.

By way of non-limiting example, a first group 308 of frames may include a first frame 310 in a subset of frames (e.g., the solid dots depicted in the first group 308) for which a first camera pose estimation may be made. The first camera pose estimation may be based on the frames included in the first group 308 which may be selected for inclusion in the corresponding subset. A second group 312 of frames may also include the first frame 310 in a subset of frames (e.g., the solid dots depicted in the second group 312) for which a second camera pose estimation may be made. The second camera pose estimation may be based on the frames included in the second group 312 which may have been selected for inclusion in the corresponding subset of frames. The second camera pose estimation may be made consistent with the first camera pose estimation by one or more techniques describe herein. This procedure may be performed iteratively over one or more other subsets of frames until a final group of frames is reached. By way of non-limiting example, by the time a third group 314 (which, for the sake of illustration may be considered the last group of frames in the video), the camera pose estimation for the first frame 310 may have been made consistent with other camera pose estimations made for the first frame 310 in the prior groups of frames. It is noted that the first frame 310 may not have been selected to for inclusion in subsets of frames corresponding to each group of frames (noting the non-solid dots in column 306).

By way of non-limiting illustration in FIG. 2, the estimation component 112 may be configured to determine a first subset of frames 218 of the first video, a second subset of frames 222 of the first video, and/or other subset of frames 224 of the first video 224. In some implementations, the second subset of frames 222 may comprise at least one frame that may be included in the first subset of frames 218. The first subset of frame 218 may include the second frame 206, and/or other frames. The second subset of frames 222 may include the third frame 207, the fourth frame 209, and/or other frames.

In some implementations, the estimation component 112 may be configured such that determining the first subset of frames 218 comprises one or more of: assigning at least some of the frames of the first video 202 into a first group 216, determining parameter values for one or more confidence parameters for individual frames assigned to the first group of frames 216, selecting frames from the first group 216 to be included in the first subset of frame 218 based on the determined values for the one or more confidence parameters, and/or other operations.

In some implementations, the estimation component 112 may be configured such that determining the second subset of frames 222 comprises one or more of: assigning at least some of the frames of the first video 202 into a second group of frames 220, determining parameter values for one or more confidence parameters for individual frames assigned to the second group 220, selecting frames from the second group 220 to be included in the second subset of frames 222 based on the determined values for the one or more confidence parameters, and/or other operations.

In some implementations, the estimation component 112 may be configured to make estimations of orientations and/or locations of the first camera in the first scene for individual frames within one or more of the first subset of frames 218 of the first video 202, the second subset of frames 222 of the first video 202, and/or other subsets of frames 224 of the first video 202. In some implementations, the estimations for camera orientation and/or location for individual frames in the first subset of frames 218 may be based on detected and tracked feature points in the frames of the first subset of frames 218. In some implementations, the estimations for camera pose for individual frames in the second subset of frames 222 may be based on detected and tracked feature points in the frames of the second subset of frames 222.

By way of non-limiting example, an estimation of a first orientation and/or location 226 of the first camera may be made by the estimation component 112 for the second frame 206 in the first subset of frames 218. The estimation of the first orientation and/or location 226 may be based on the detected and tracked feature points in the frames of the first subset of frames 218. By way of non-limiting example, an estimation of a second orientation and/or location 228 of the first camera may be made for the third frame 207 in the second subset of frames 222. The estimation of the second orientation and/or location 228 may be based on detected feature points in frames of the second subset of frames 222.

In some implementations, the estimation component 112 may be configured such that estimating orientations and/or locations of the first camera in the first scene based on individual frames within the first subset of frames 218 may comprise performing a bundle adjustment over the individual frames of the first subset of frames 218. The bundle adjustments may concurrently determine estimates of three-dimensional coordinates of feature points detected in the frames of the subsets of frames.

In some implementations, the estimation component 112 may be configured to update estimations of orientation and/or location of the first camera for individual frames in the second subset of frames 222 based on estimations for orientation and/or location of the first camera for corresponding frames in the first subset of frames 218 and/or other subsets of frames. By way of non-limiting example, based on the third frame 207 and second frame 206 comprising that same frame of the first video 202, the second orientation and/or location 228 may be updated 230 based on the first orientation and/or location 226. By way of non-limiting example, the updating 230 of the second orientation and/or location 228 based on the first orientation and/or location 226 may be based on a linear camera pose estimation, global camera pose optimization, bundle adjustment, and/or other techniques.

Returning to FIG. 1, the anchor component 114 may be configured to determine estimations of camera orientation/location for individual frames that may be used as fixed estimations. In some implementations, determining estimations that may be used as fixed estimations may provide links between different parts of a video that may have shared and/or common feature points. These links may be used in an interpolation operation to obtain a global initialization, described in more detail herein. By way of non-limiting example, detecting and/or tracking feature points over consecutive frames may not guarantee any form of global consistency of a reconstructed scene. For example, when a camera revisits the same feature points multiple times over with intermediate occlusions, a single scene feature point may be represented by multiple, individually tracked points. In an exemplary implementation, to provide for at least some consistency, one or more frames that share common feature points (e.g., indicative of being a "revisit" of the feature point by a camera) may be identified. The corresponding estimations of camera orientation and/or location for these frames may be used as fixed estimations. This problem may also be known as the "loop-closing" problem.

In some implementations, identifying frames that may share common feature points may be based on one or more of comparison of frames included in the individual subsets of frames, and/or other techniques. In some implementations, comparison of frames may comprise one or more of determining a similarity measure between frames, determining an uncertainty measure of the estimated camera orientations and/or locations for those frames, and/or other operations. Similarity measures may be determined based on histograms of the detected feature points of the individual frames and/or other techniques. By way of non-limiting example, histograms of feature descriptors based on SIFT descriptors and/or other descriptors may return a matrix that may facilitate identifying frames that may likely share common feature points.

By way of non-limiting example, over a long video sequence it may be likely that a camera returns to similar positions in a 3D scene, viewing it from similar angles. Explicit fixed links (e.g., anchors) may be established between camera positions/input frames that may have been recorded at such a similar position. These links may facilitate making sure any kind of tracking or reconstruction error is not "accumulated" over the whole video sequence, but corrected by using these links. By way of non-limiting example, intuitively, if the camera sees the same image twice at different points in time, then the 3D locations for the two images that may be reconstructed should be substantially identical. A similarity matrix that may be constructed here may measures in each matrix row/column (i,j) how similar a set of two or more images may be. If they are similar, then the system may compute the same or similar camera position for the images.

In some implementations, determining an uncertainty measure may comprise one or more of determining a variance between individual estimated camera orientations and/or locations for individual frames relative to estimated three-dimensional coordinates of feature points determined for a corresponding subset of frames, determining a variance between subsets of frames by averaging the summed variances of individual estimated camera orientation and/or locations for frames within the subset of frames, finding a path between individual frames and subsets of frames with the lowest summed variance for each camera pair and/or other operations.

In some implementations, determining variance information and/or other uncertainty measure may be based on determining values for one or more stability parameters and/or other information. Stability parameters may correspond to one or more of a number of feature points in a given frame, a distribution of point projection in a frame image, a ratio between a smallest and largest principal component of feature point positions, and/or other information.

For illustrative purposes, stability parameters may include one or more of a first stability parameter $\zeta_1$, a second stability parameter $\zeta_2$, a third stability parameter, $\zeta_3$; and/or other parameters; wherein:

$$\zeta_1 = n,$$

where 'n' may represent a number of feature points in a given frame, which may be used to make sure that there are enough constraints for optimization;

$$\zeta_2 = \min(\text{Std}(p_x); \text{Std}(p_y)),$$

which may represent a distribution of feature point projections in a frame, and which may be used to avoid unstable configurations with very localized feature positions; and $$\zeta_3 = \frac{PCA(p)\min}{PCA(p)\max},$$

which may represent a ratio between a smallest and a largest principal component of the feature point positions, which may help to avoid using ambiguous, two-dimensional scenes.

In some implementations, determining a variance between individual estimated camera orientations and/or locations for individual frames relative to estimated three-dimensional coordinates of feature points determined for a corresponding subset of frames may be obtained based on:

$$\text{Var}(c_i, w_i) \propto 1/(\min(x, \zeta_1) \cdot \zeta_2 \cdot \zeta_3)^2,$$

where $w_j$ represents a current subset of frames, $c_i$ represents a current estimated camera orientation and/or location, and "x" represents the quantity of feature points tracked over the current subset of frames. In some implementations, "x" may be set to a value of 25, and/or other value.

In some implementations, determining a variance between subsets of frames by averaging the summed variances of individual estimated camera orientation and/or locations for frames within the subset of frames may be obtained based on:

$$\text{Var}(w_{j_1}, w_{j_2}) = \sum_{i=1}^{n} \frac{\text{Var}(c_i, w_{j_1}) + \text{Var}(c_i, w_{j_2})}{n^2}.$$

The above operation may results in a variance matrix "V." A matrix "S" may be estimated that may represent potential frames to be used as global links (e.g., fixed estimations) based on:

$$S = (1 - C) \circ V,$$

where $C_{ij} \in (0,1)$, and "$\circ$" represents an element-wise product of matrices. Matrix 'S' may then be sampled to identify frame pairs $(f_1, f_2)$ that may be associated with estimations of camera orientation and/or location that may be used as fixed estimations.

In some implementations, to ensure that the identified frame pairs $(f_1, f_2)$ associated with fixed estimations may truly be useful, a geometrical verification of the camera poses and/or other type of verification may be used. A subset of frames having the most available features points that contain the frame, $f_1$, and an estimated camera pose that is the same or similar to an estimated camera pose for frame $f_2$, may be selected and utilized to link $f_2$'s feature points to $f_1$'s feature points. This information may allow for exploitation of the already estimated scene geometry. Multiple passes of a bundle adjustment and/or other camera pose estimation and/or scene reconstruction techniques may be performed using the estimated camera poses for the subset of frame. Feature points having reprojection errors worse than an average between the passes may be removed. Inconsistent reprojections may be removed by this procedure. A geometric verification may be considered successful if the frame pairs pass one or more of the following stability thresholds: $\zeta_1 \geq 25$, $\zeta_2 \geq 0.075 \cdot \text{ImageSize}$, and/or $\zeta_3 \geq 0.1$.

By way of non-limiting illustration in FIG. 2, the anchor component 114 may be configured to determine that estimation of camera orientation and/or location for the fourth frame 209 and/or other frames may be used as a first fixed estimation 232 of camera orientation and/or location. By way of non-limiting example, the anchor component 114 may be configured to determine that the estimation of camera orientation and/or location for the fourth frame 209 may be used as a fixed estimation of orientation and/or location based on identifying that the fourth frame 209 and/or at least one other frame share one or both of common feature points and/or estimated orientations and/or locations of the first camera. The anchor component 114 may be configured to determine that other estimations for camera orientation and/or location for other frames may be used as other fixed estimations 234 of orientation and/or location of the first camera.

Returning to FIG. 1, the global component 116 may be configured to determine orientation and/or location of one or more cameras in frames of a video based on one or more of the estimated camera orientations and/or locations for individual frames within individual subsets of frames, the fixed estimations of camera orientation and/or location, and/or other information. In some implementations, determining camera orientation and/or location may comprise one or more of updating previously made estimations of camera orientation and/or location for frames included within individual subsets of frames, determining camera orientation and/or location for frames not included within individual subsets of frames, and/or other operations.

In some implementations, updating previously made estimations of camera orientation and/or location for frames included within individual subsets of frames may comprise performing one or more of a linear camera pose estimation using the estimated camera orientations and/or locations for individual frames within individual subsets of frames and the fixed estimations of camera orientation and/or location, one or more nonlinear least squares optimization passes, and/or other operations. In some implementations, a least square optimization pass may correspond to one or more of a No Field Of View (FoV) optimization without bad point removal ("A"), a No FoV optimization with bad point removal ("B"), a FoV optimization with pad point removal ("C"), and/or other operations. In some implementations, a sequence of one or more least square optimization passes may be performed. By way of non-limiting example, in some implementations a sequence comprising "ABABAB-CCC" may be performed. Skipping bad point removal ("A") at the beginning may avoid the removal of reliable feature points because of a bad initialization, thus loosing valuable information for optimization. FoV optimization ("C") may be added at the end, because it may converge to singularities in small or badly initialized scenes geometries.

In some implementations, when the camera pose for frames within the subsets of frames are determined and/or corresponding three-dimensional scene points are determined, camera orientation and/or location for frames not included within individual subsets of frames may be determined. This may include initializing the camera poses for these frames by linear interpolation using the camera poses for the frame within the subsets of frames, and/or other techniques. A bundle adjustment may be performed using the known feature point three-dimensional coordinates as constraints to determine the camera orientation and/or location for frames not included within individual subsets of frames.

By way of non-limiting illustration in FIG. 2, the global component 116 may be configured to determine orientation and/or location of the first camera in the frames of the first video 202 based on one or more of the estimated first camera orientation and/or location 226, estimated second camera orientation and/or location 228, fixed estimations of camera orientation and/or location (e.g., first fixed estimation 232 and/or other fixed estimations), and/or other information.

In some implementations, determining orientation and/or location of the first camera for the frames of the first video 202 may comprise performing a bundle adjustment on one or more frames of the first video 202 using the estimated first camera orientation and/or location 226, estimated second camera orientation and/or location 228, fixed estimations of camera orientation and/or location (e.g., first fixed estimation 232 and/or other fixed estimations), and/or other information. In some implementations, determining orientation and/or location of the first camera in the one or more frames of the first video 202 may comprise one or more of updating estimated camera orientation and/or location for the first camera in frames included in the first subset of frames 218 and/or other subsets of frames; determining camera orientation and/or location for the first camera in frames in the first group of frames 216 that may not have been included in the first subset of frames 218; determining camera orientation and/or location for the first camera in frames in other group of frames 224 that may not have been included in the corresponding subset of frames of those groups; and/or other operations.

In some implementations, determining camera orientation and/or location for the first camera in frames in the first group of frames 216 that are not included in the first subset of frames 218 may be based on a linear interpolation of the updated camera orientation and/or location for the first camera in frames included in the first subset of frames 218.

Returning to FIG. 1, the server 102, computing platforms 122, and/or external resources 124 may be operatively linked via one or more electronic communication links. For example, such electronic communication links may be established, at least in part, via a network 121 such as the Internet and/or other networks. It will be appreciated that this is not intended to be limiting and that the scope of this disclosure includes implementations in which server 102, computing platforms 122, and/or external resources 124 may be operatively linked via some other communication media.

The external resources 124 may include sources of information, hosts, and/or providers of virtual spaces outside of system 100, external entities participating with system 100, external entities for player-to-player communications, and/or other resources. In some implementations, some or all of the functionality attributed herein to external resources 124 may be provided by resources included in system 100.

The server 102 may include electronic storage 118, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor 104, information received from server 102, information received from computing platforms 122, and/or other information that enables server 102 to function as described herein.

Processor(s) 104 is configured to provide information-processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. The processor 104 may be configured to execute components 108, 110, 112, 114, and/or 116. Processor 104 may be configured to execute components 108, 110, 112, 114, and/or 116 by software; hardware; firmware; some combination of software, hardware, and/or firmware; and/or other mechanisms for configuring processing capabilities on processor 104.

It should be appreciated that although components 108, 110, 112, 114, and/or 116 are illustrated in FIG. 1 as being co-located within a single processing unit, in implementations in which processor 104 includes multiple processing units, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, 116, and/or other components. As another example, processor 104 may be configured to execute one or more additional components that may perform some or all of the functionality attributed below to one of components 108, 110, 112, 114, and/or 116.

Figure 4:
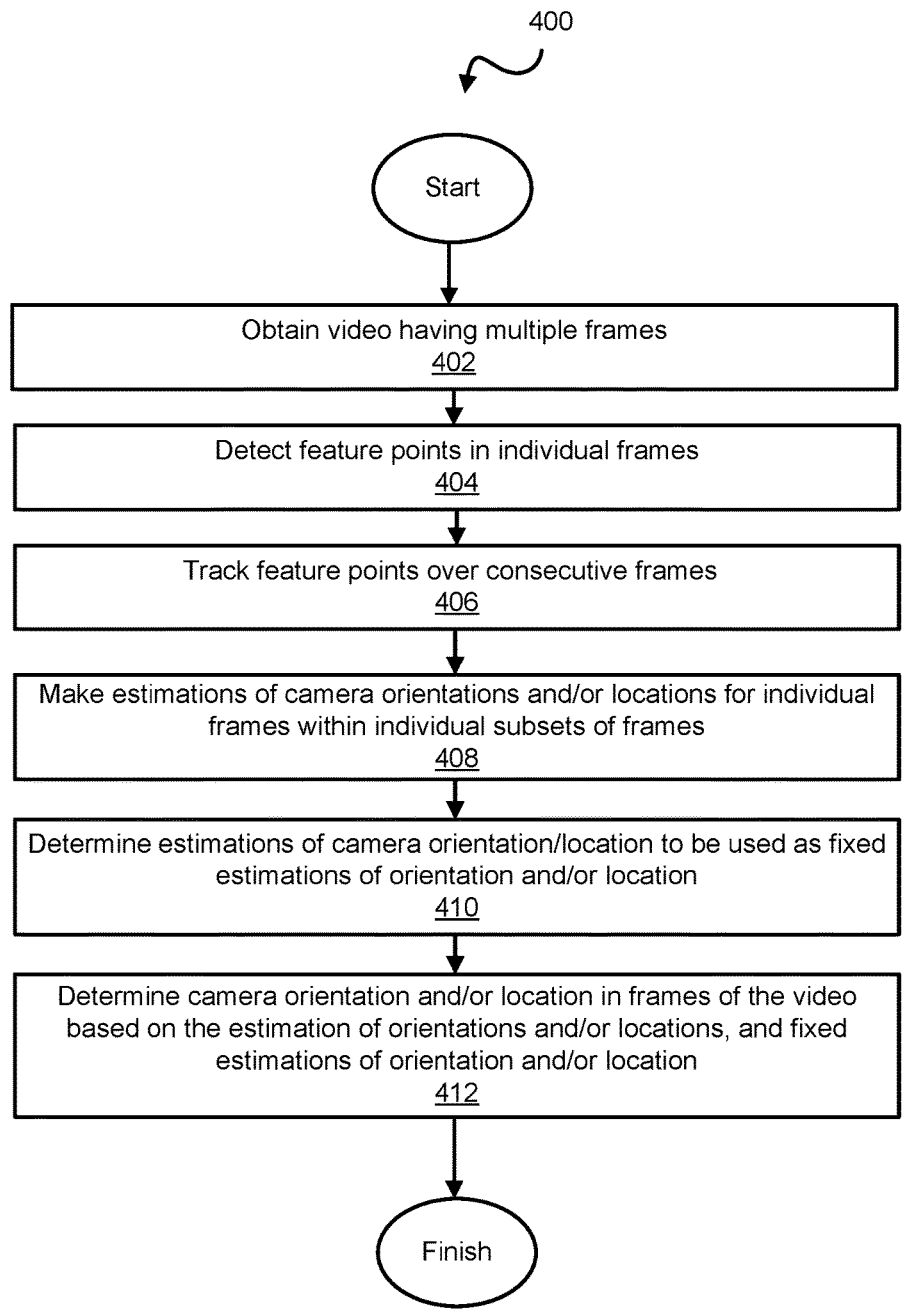
FIG. 4 illustrates a method of facilitating three-dimensional reconstruction of scenes from videos, in accordance with one or more implementations.

FIG. 4 illustrates a method 400 of facilitating three-dimensional reconstruction of scenes from videos. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on electronic storage medium. The one or more processing devices may include one or more devices configured through hardware, firmware, and/or software to be specifically designed for execution of one or more of the operations of method 400.

At an operation 402, a video having multiple frames may be obtained. The video may depict a first scene and/or other scenes captured from a first camera and/or other cameras. In some implementations, operation 402 may be performed by one or more physical processors executing a video component the same as or similar to video component 108 (shown in FIG. 1 and described herein).

At an operation 404, feature points of the first scene and/or other scenes may be detected in individual frames of the video. By way of non-limiting example, a first set of feature points may be detected in a first frame of the video. In some implementations, operation 404 may be performed by one or more physical processors executing a feature component the same as or similar to feature component 110 (shown in FIG. 1 and described herein).

At an operation 406, detected features points may be tracked over consecutive frames by correlating feature points between consecutive frames. By way of non-limiting example, the first set of feature points may be tracked from the first frame to one or more other frames by correlating the first set of feature points detected in the first frame with other detections of the first set of feature points in the one or more other frames. In some implementations, operation 406 may be performed by one or more physical processors executing a feature component the same as or similar to the feature component 110 (shown in FIG. 1 and described herein).

At an operation 408, estimations of orientations and/or locations of the first camera in the first scene for individual frames within a first subset of frames, a second subset of frames, and/or other subsets of frames may be made. The second subset of frames may comprise at least one frame that is not included in the first subset of frames. The estimations may be based on the detected and tracked feature points of the respective subsets of frames. By way of non-limiting example, an estimation of a first orientation and/or location 226 of the first camera may be made for a second frame in the first subset of frames based on the detected and tracked feature points in the first subset of frames. An estimation of a second orientation and/or location 228 of the first camera may be made for a third frame in the second subset of frames based on detected feature points in the second subset of frames. In some implementations, operation 408 may be performed by one or more physical processors executing an estimation component the same as or similar to the estimation component 112 (shown in FIG. 1 and described herein).

At an operation 410, estimations of camera orientation/location may be determined to be used as fixed estimations of orientation and/or location. In some implementations, operation 410 may be performed by one or more physical processors executing an anchor component the same as or similar to the anchor component 114 (shown in FIG. 1 and described herein).

At an operation 412, orientation and/or location of the first camera in the frames of the video may be determined. The determination may be based on the estimated first camera orientation and/or location, estimated second camera orientation and/or location, other estimated camera orientations and/or locations, the fixed estimations of orientation and/or location, and/or other information. The orientation and/or location of the first camera for the frames of the video may facilitate three-dimensional reconstruction of the first scene and/or other scenes of the video. In some implementations, operation 412 may be performed by one or more physical processors executing a global component the same as or similar to the global component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate three-dimensional reconstruction of scenes depicted in videos, the system comprising:
    one or more physical processors configured by machine-readable instructions to:
        obtain a video having multiple frames, the video depicting a first scene captured from a first camera, the first scene including feature points within individual frames of the video, the feature points being tracked over consecutive frames by correlating the feature points between the consecutive frames, a first frame of the video including a first set of feature points, the first set of feature points being tracked from the first frame to one or more other frames by correlating the first set of feature points within the first frame with the first set of feature points present within the one or more other frames;
        make estimations of orientation and/or location of the first camera in the first scene for individual frames within a first subset of frames of the video and a second subset of frames of the video, the second subset of frames comprising at least one frame not included in the first subset of frames, the estimations being based on the detected and tracked feature points of the first subset of frames and second subsets of frames, such that an estimation of a first orientation and/or location of the first camera is made for a second frame in the first subset of frames based on the detected and tracked feature points in the first subset of frames, and an estimation of a second orientation and/or location of the first camera is made for a third frame in the second subset of frames based on detected feature points in the second subset of frames;
        determine estimations of camera orientation and/or location which provide fixed estimations of orientation and/or location; and
        determine orientation and/or location of the first camera in the frames of the video based on the estimated first camera orientation and/or location, estimated second camera orientation and/or location, and the fixed estimations of orientation and/or location, the determined orientation and/or location of the first camera for the frames of the video facilitating three-dimensional reconstruction of the first scene of the video.

2. The system of claim 1, wherein the one or more physical processors are further configured by machine-readable instructions such that estimating orientation and/or location of the first camera in the first scene based on individual frames within the first subset of frames comprises performing a bundle adjustment over the individual frames of the first subset of frames, and wherein performing the bundle adjustment further determines estimates of three-dimensional coordinates for feature points detected and tracked through the frames in the first subset of frames.

3. The system of claim 1, wherein the one or more physical processors are further configured by machine-readable instructions to update the estimations of orientation and/or location of the first camera for individual frames in the second subset of frames based on estimations of orientation and/or location of the first camera for corresponding frames in the first subset of frames, such that based on the second frame and the third frame comprising the same frame of the first video, the second orientation and/or location is updated based on the first orientation and/or location.

4. The system of claim 3, wherein updating estimations is based on a linear camera pose estimation.

5. The system of claim 1, wherein the one or more physical processors are further configured by machine-readable instructions such that determining estimations which provide fixed estimations of orientation and/or location comprises:
identifying pairs of frames sharing common feature points and estimated orientation and/or location of the first camera.

6. The system of claim 1, wherein the one or more physical processors are further configured by machine-readable instructions such that determining orientation and/or location of the first camera for the frames of the video comprises performing a bundle adjustment on the frames of the video using the estimated first camera orientation and/or location, the second camera orientation and/or location, and the fixed estimations of orientation and/or location as constraints.

7. The system of claim 1, wherein the one or more physical processors are further configured by machine-readable instructions to determine the first subset of frames, wherein determining the first subset of frames comprises:
assigning at least some of the frames of the video into a first group;
determining parameter values for one or more confidence parameters associated with detected feature points in individual frames assigned to the first group; and
selecting frames from the first group to be included in the first subset based on associated parameter values for the one or more confidence parameters of the frames meeting or exceeding corresponding threshold values for the one or more confidence parameters.

8. The system of claim 7, wherein the one or more physical processors are further configured by machine-readable instructions such that individual confidence parameters are associated with one or more of:
a quantity of feature points in a given frame corresponding to feature points detected in one or more other frames of the first group;
a distance the first camera has moved within the first scene by a point in time corresponding to the given frame; or
a reprojection error for feature points detected in and tracked to the given frame.

9. The system of claim 7, wherein the one or more physical processors are further configured by machine-readable instructions such that determining orientation and/or location of the first camera in the frames of the video based on the estimated first camera orientation and/or location, the second camera orientation and/or location, and the fixed estimations of orientation and/or location comprises:
updating the estimations of camera orientation and/or location for the first camera in the frames included in the first subset of frames; and
determining camera orientation and/or location for the first camera in the frames in the first group of frames not included in the first subset of frames.

10. The system of claim 9, wherein the one or more physical processors are further configured by machine-readable instructions such that determining camera orientation and/or location for the first camera in the frames in the first group of frames not included in the first subset of frames is based on a linear interpolation of the updated estimations of the camera orientation and/or location for the first camera in frames included in the first subset of frames.

11. A method of facilitating three-dimensional reconstruction of scenes depicted in videos, the method being implemented in a computer system comprising one or more physical processors and storage media storing machine-readable instructions, the method comprising:
obtaining a video having multiple frames, the video depicting a first scene captured from a first camera, the first scene including feature points within individual frames of the video, the feature points being tracked over consecutive frames by correlating the feature points between the consecutive frames, a first frame of the video including a first set of feature points, the first set of feature points being tracked from the first frame to one or more other frames by correlating the first set of feature points within the first frame with the first set of feature points present within the one or more other frames;
making estimations of orientation and/or location of the first camera in the first scene for individual frames within a first subset of frames of the video and a second subset of frames of the video, the second subset of frames comprising at least one frame not included in the first subset of frames, the estimations being based on the detected and tracked feature points of the first subset of frames and second subsets of frames, including making an estimation of a first orientation and/or location of the first camera for a second frame in the first subset of frames based on the detected and tracked feature points in the first subset of frames, and making an estimation of a second orientation and/or location of the first camera for a third frame in the second subset of frames based on detected feature points in the second subset of frames;
determining estimations of camera orientation/location which provide fixed estimations of orientation and/or location; and
determining orientation and/or location of the first camera in the frames of the video based on the estimated first camera orientation and/or location, estimated second camera orientation and/or location, and the fixed estimations of orientation and/or location, the orientation and/or location of the first camera for the frames of the video facilitating three-dimensional reconstruction of the first scene of the video.

12. The method of claim 11, wherein making estimations of orientation and/or location of the first camera in the first scene for individual frames within the first subset of frames comprises performing a bundle adjustment over the individual frames of the first subset of frames, and wherein performing the bundle adjustment further determines estimates of three-dimensional coordinates for feature points detected and tracked through the individual frames in the first subset of frames.

13. The method of claim 11, further comprising:
updating estimations of orientation and/or location of the first camera for individual frames in the second subset of frames based on the estimations of orientation and/or location of the first camera for corresponding frames in the first subset of frames, such that based on the second frame and the third frame comprising the same frame of the first video, the second orientation and/or location is updated based on the first orientation and/or location.

14. The method of claim 13, wherein updating estimations is based on a linear camera pose estimation.

15. The method of claim 11, wherein determining estimations that provide the fixed estimations of orientation and/or location comprises:
   identifying pairs of frames sharing common feature points and estimated orientation and/or location of the first camera.

16. The method of claim 11, wherein determining orientation and/or location of the first camera for the frames of the video comprises performing a bundle adjustment over the frames of the video using the estimated first camera orientation and/or location, the second camera orientation and/or location, and the fixed estimations of orientation and/or location as constraints.

17. The method of claim 11, further comprising determining the first subset of frames, wherein determining the first subset of frames comprises:
   assigning at least some of the frames of the video into a first group;
   determining parameter values for one or more confidence parameters associated with detected feature points in individual frames assigned to the first group; and
   selecting frames from the first group to be included in the first subset based on associated parameter values for the one or more confidence parameters of the frames meeting or exceeding corresponding threshold values for the one or more confidence parameters.

18. The method of claim 17, wherein confidence parameters are associated with one or more of:
   a quantity of feature points in a given frame corresponding to feature points detected in one or more other frames of the first group;
   a distance the first camera has moved within the first scene by a point in time corresponding to the given frame; or
   a reprojection error for feature points detected in and tracked to the given frame.

19. The method of claim 17, wherein determining orientation and/or location of the first camera in the frames of the video based on the estimated first camera orientation and/or location, the second camera orientation and/or location, and the fixed estimations of orientation and/or location comprises:
   updating the estimations of camera orientation and/or location for the first camera in frames included in the first subset of frames; and
   determining camera orientation and/or location for the first camera in frames in the first group of frames not included in the first subset of frames.

20. The method of claim 19, wherein determining camera orientation and/or location for the first camera in frames in the first group of frames not included in the first subset of frames is based on a linear interpolation of the updated estimations of the camera orientation and/or location for the first camera in frames included in the first subset of frames.

* * * * *